Patented Dec. 18, 1951

2,578,904

UNITED STATES PATENT OFFICE 2,578,904

STABILIZATION OF CHLORINATED ETHYLENE POLYMER

Gelu Stoeff Stamatoff, Nutley, N. J., assignor to E. I. du Pont de Nemours & Company, Wilmington, Del., a corporation of Delaware No Drawing. Application March 18, 1949, Serial No. 82,267

9 Claims. (Cl. 260—8)

This invention relates to the stabilization of halogen-containing polymers and, more particularly, to a process of treating solid chlorine-containing polymers in an aqueous medium at an elevated temperature to improve their heat stability.

Various stabilizers and stabilizing treatments have been described in the literature for decreasing the discoloration of halogen-containing polymers as well as for decreasing the liberation of hydrogen halide when these polymers are heated at elevated temperatures. Among the stabilizers used have been alkaline materials such as the alkali metal hydroxides and carbonates, amines, epoxy compounds, and the like. One method for eliminating unstable chlorine, for example, in these polymers has been to boil the polymer with caustic with the intention of leaving only stable chlorine atoms in the polymer, so that when the treated polymer is heated at elevated temperatures, there is no further tendency to split out hydrogen chloride. These various stabilizers have been incorporated both in the washing and purification stage of handling the chlorine-containing polymers as well as incorporated with the purified polymer either by rolling, by mixing with the pulverized dry polymer, or by coating the polymer particles in a solvent or non-solvent.

The above methods of stabilizing chlorine-containing polymers have met with more or less success for certain applications; some have rendered particular polymers capable of being commercially used in a number of applications where previously the unstabilized polymers were considered useless. However, when the chlorine-containing polymers are prepared by methods which yield an aqueous emulsion or aqueous suspension of the polymer (such as by polymerization of vinyl chloride in aqueous emulsion or by chlorination of ethylene polymer in aqueous suspension), still other problems are faced when it is desired to isolate the polymer from the crude aqueous medium in a dry, stable form.

One such problem has been encountered when attempting to dry wet chlorinated ethylene polymer in conventional metal driers after the crude polymer containing residual hydrochloric acid has been treated with alkali and thoroughly washed with water. Regardless of the drying temperature used to remove the last traces of water, hydrogen chloride is evolved from the chlorinated ethylene polymer. This results in corrosion of the metal driers and discoloration of the polymer as well as metal contamination which catalyzes further decomposition of the polymer. One method of minimizing this corrosion during drying is to treat the polymer first in an aqueous medium at an elevated temperature with a combination of an inorganic base, such as sodium hydroxide, an amine salt of a fatty acid, such as monoethanolamine stearate, and sodium hypophosphite. Other additives which have been found to minimize corrosion when used in a similar manner include monoethanolamine, stearyl amine, urea and ammonium hydroxide. In all cases where these additives were employed in amounts sufficient substantially to eliminate corrosion during drying, the evolution of hydrogen chloride was not eliminated and the dried polymer resulting from such treatment was inferior in that the polymer had poor light stability, discolored badly on heating, could not be extruded, or in some other way was commercially unsatisfactory.

It has also been found that when the crude chlorinated ethylene polymer is boiled under pressure at about 130° C.–140° C. for two to three hours with an excess of aqueous sodium hydroxide, no hydrochloric acid is evolved in the drier but the polymer agglomerates and cannot be separated into finely-divided discrete particles. A method for eliminating corrosion which may be more apparent yet rather costly, is to provide a liner for the metal drier which is inert to the corrosive action of hydrochloric acid. Satisfactory liners inert to these conditions may be made of either glass or polytetrafluoroethylene. At best the various tolerable stabilizers and treatments used heretofore have minimized the decomposition of the polymer at elevated temperatures, but under certain conditions such as in contact with metal in an aqueous atmosphere even a small amount of hydrochloric acid evolved is still troublesome and is not conducive to the preparation of a commercially satisfactory stable polymer at a reasonable cost.

It is therefore an object of this invention to provide a process for improving the heat stability of finely-divided solid chlorine-containing polymers. A further object is to provide a process for treating finely-divided preformed chlorinated solid ethylene polymers such that the resulting polymers are completely free of acid before and after heating at elevated temperatures. Another object is to provide a chlorinated solid ethylene polymer which is not only free of acid but does not discolor when heated at 160° C. in air. Another object is to provide a process for purifying chlorinated solid ethylene polymers suspended in an aqueous medium under conditions such that the polymers may be dried in contact with metal without producing corrosion of the metal. Other objects will be apparent from the description of the invention given hereinafter.

The above objects are accomplished according to the present invention by agitating at a temperature of at least 50° C. a finely-divided, preformed solid chlorine-containing polymer suspended in an aqueous medium containing, per 100 parts of polymer by weight, 0.2–5 parts of propene oxide. More particularly, the invention is applicable to the stabilizing of finely-divided, preformed chlorinated solid ethylene polymer and the treatment is carried out at a temperature of 50° C.–110° C., preferably, 70° C.–90° C.

In a preferred form, the invention comprises agitating the finely-divided polymer suspended in the aqueous medium containing, per 100 parts of polymer by weight, not only the propene oxide but also, specifically for the purpose of preventing discoloration of the polymer, 0.1–0.5 part of a proteinaceous substance and 0.2–0.4 part of a substituted phenol. More specifically, with respect to stabilization of chlorinated solid ethylene polymer, it is preferred to use, per 100 parts of polymer, 0.5–2 parts of propene oxide, 0.1–0.2 part of gelatin as the proteinaceous substance, 0.2–0.4 part of octyl phenol or p-hydroxy biphenyl as the substituted phenol.

The present invention resides to a great extent in the discovery of the specific action of propene oxide, i. e., propylene oxide, 1,2-epoxypropane, in freeing these chlorinated polymers of any acid and loosely bound chlorine. This action, at least to anything like the same extent, is apparently a unique characteristic of propene oxide as it is not shared with other epoxy compounds or even with other closely related homologous epoxides. For example, such compounds as ethylene oxide, isobutylene oxide, and butadiene monoxide, to cite but a few specific epoxides, when substituted for the propene oxide in this process proved completely ineffective in removing all residual acid from the dried polymer. Further, propene oxide itself does not exhibit this unique property to any appreciable degree until the temperature of the aqueous suspension is raised to 50° C.; thereafter, as the temperature increases up to 90° C., the action of the propene oxide is progressively enhanced in that smaller and smaller amounts of it will effect complete removal of residual acid from the polymer.

Although it is entirely unnecessary from the operative point of view, it is more economical and efficient to wash the crude polymer thoroughly with water to remove a large part of the acid before treatment with the propene oxide as the propene oxide is not required to remove the bulk of the acid. Further, it is preferred to add an alkaline substance to the suspension as this also economizes on the quantity of propene oxide required to remove completely all residual acid. In practice, it is preferred to add an alkali metal hydroxide to the suspension in sufficient quantity to raise the pH above 7 and even to as high as 10 or 11.

A typical procedure for practicing the invention will be described with reference to chlorinated ethylene polymer as the chlorine-containing polymer. The finely-divided, preformed solid chlorinated ethylene polymer obtained as a crude reaction mixture contaminated with acid and suspended in an aqueous medium is washed completely with hot water until the majority of the acid has been removed. Then a sufficient quantity of an alkali metal hydroxide is added to the hot aqueous mixture to bring the pH above 7, with the temperature kept above 50° C. With continual agitation a small proportion of a proteinaceous substance such as gelatin is added and the temperature raised to 90° C. Then a small amount of propene oxide in cold water is added and the suspension further stirred at 90° C. for a time sufficient to remove all the free acid which is bound up within the polymer particles. After centrifuging, the discrete particles of wet polymer are dried, usually at elevated temperatures, to remove the last traces of moisture. Somewhat further protection is afforded if an anti-oxidant is added to the aqueous polymer suspension while it is being agitated above 50° C.; or, with equally good results, the anti-oxidant may be afterwards incorporated into the dried polymer by well known methods.

The following examples wherein all proportions are given by weight unless otherwise stated, illustrate specific embodiments of the invention.

*Example I*

Chlorinated solid ethylene polymer (27% Cl) was prepared by chlorinating uncompacted finely-divided particles of solid ethylene polymer suspended in water according to the process described by R. S. Taylor in U. S. application Ser. No. 686,149, filed July 25, 1946, now abondoned, assigned to the assignee of the instant application. One hundred parts of the crude chlorinated polymer was dropped from the chlorination kettle into a washing tank. The mother liquor was drained off and the polymer was washed twice with hot water (at least 90° C.) using about 500 parts of water for each wash. The wet polymer analyzed about 35% solids and 0.02% hydrochloric acid. To this finely-divided polymer was added with good agitation 465 parts of hot water (about 90° C.) followed by one part of sodium bicarbonate, 0.1 part of gelatin and 0.4 part of octyl phenol. The mixture was agitated at 90° C. for 15 minutes; then two parts of propene oxide dissolved in 12 parts of cold water were added. Heating was continued at 90° C. with thorough agitation for another 15 minutes. The polymer was then centrifuged and dried at 60° C. for three days in a circulating air oven. During drying no hydrogen chloride was evolved.

The dried polymer was characterized by freedom from discoloration after a four hour stability test in a mechanical convection air oven at 160° C., and by excellent molding and rolling properties. The polymer was completely free of acid prior to drying and after drying.

*Example II*

The following ingredients were combined at room temperature and then stirred and heated at 50° C.–60° C. for thirty minutes. The chlorinated ethylene polymer used was obtained by the same process as described in Example I:

| | Parts |
|---|---|
| Chlorinated ethylene polymer (28–30% Cl), water wet (i. e. 100 parts dry polymer in 217 parts water) | 317 |
| Water (additional) | 740 |
| Sodium bicarbonate | 0.87 |
| Gelatin | 0.1 |
| Octyl phenol | 0.2 |
| Propene oxide | 3.6 |

The polymer was filtered and dried at 70° C.–80° C. overnight. This polymer did not evolve hydrogen chloride during drying at temperatures as high as 130° C. Furthermore, it did not discolor upon heating at 160° C. in an air-circulating mechanical convection oven for 2 hours and it showed a good stability both on rolling and on molding at temperatures as high as 182° C.

Example III

The same procedure and same amounts of materials as described in Example I were employed to wash a crude batch of chlorinated ethylene polymer obtained from the chlorination kettle, except that the sodium bicarbonate was replaced with 3 parts of sodium hydroxide and the octyl phenol was replied with 0.4 part of p-hydroxy biphenyl. The dried polymer was characterized by an excellent heat stability and good molding and extrusion properties.

Example IV

To a kettle were added 500 parts of water, 0.1 part of gelatin and 0.4 part of sodium hydroxide. The mixture was heated to 90° C. and, while stirring, there was added 100 parts of a finely-divided copolymer of vinyl chloride and vinylidene chloride, 2.1 parts of propene oxide dissolved in 50 parts cold water, and 0.4 part of p-hydroxy biphenyl. Heating with agitation was continued at 90° C. for 15 minutes longer, and then the polymer was filtered and dried. A compression molded chip from this treated polymer was characterized by a better heat stability than that of the untreated polymer, as evidenced by considerably less color of the treated molded chip and less hydrogen chloride evolved on heating the treated polymer at 130° C.

Example V

The same treatment as described in Example IV using the same quantities of materials was applied to a sample of a finely-divided copolymer of vinyl chloride and vinyl acetate in place of the copolymer of Example IV. The color of a molded chip of the treated polymer was far superior to that made from the untreated polymer.

Example VI

The procedure and materials described in Example II were used to treat an equivalent sample of chlorinated ethylene polymer except for the fact that the gelatin and octyl phenol were entirely eliminated. Upon heating the treated polymer on a glass plate in air at 160° C. for one-half hour there was no discoloration of the treated polymer. After drying a sample of the treated polymer on a stainless steel plate at 70° C. for 30 minutes there was no evolution of hydrogen chloride as evidenced by complete lack of corrosion of the metal plate.

The above test was repeated on a sample of the same crude chlorinated ethylene polymer using the same additives as above (i. e. in the absence of gelatin and octyl phenol) except that the aqueous polymer suspension was agitated for 30 minutes at room temperature (approximately 25° C.). Upon heating the treated polymer at 160° C. for one-half hour on a glass plate there was no evidence of discoloration. However, when a sample of the treated polymer was dried on a stainless steel plate at 70° C. for 30 minutes much corrosion occurred and evolution of hydrogen chloride took place. This illustrates the necessity for carrying out the treatment in the presence of propene oxide above 50° C. This example also illustrates that the gelatin and anti-oxidant are not necessary for completely freeing the polymer of acid.

It will be understood that the above examples are merely illustrative and the invention broadly comprises stabilizing solid chlorine-containing polymers by agitating at a temperature of at least 50° C. the polymer suspended in an aqueous medium containing, per 100 parts of polymer by dry weight, 0.2-5 parts of propene oxide.

This invention is applicable to chlorine-containing polymers in general since it is the removal of the residual acid that is involved in the stabilizing and the chemical structure of the polymer or whether the compound is chlorinated before or after polymerization are quite immaterial. The invention is of greatest value as applied to those chlorinated polymers which require for important uses the complete removal of residual acid and which the prior art methods had failed to stabilize satisfactorily. For this reason the stabilization of the chlorinated solid ethylene polymers is of special value. Such polymers are disclosed in Fawcett U. S. Patent 2,183,556 and may contain widely varying amounts of chlorine. The chlorinated ethylene polymers containing from 20%-40% chlorine are particularly useful.

Other chlorinated polymers suitable for treatment by the present invention include polyvinyl chloride and its numerous copolymers, polyvinylidene chloride, chlorosulfonated ethylene polymers, alpha-chloroacrylic acid esters, chlorinated polystyrene, polychlorostyrene, chlorinated rubber, and chlorinated paraffin.

The invention is designed for treatment of crude polymers or, at least, polymers containing residual acid and not completely stabilized. It is not applicable during the process of forming the polymers but is restricted to the treatment of preformed polymers. The polymer should be in finely-divided form to allow the maximum surface area of the polymer particles to contact the propene oxide but the particular degree of fineness is not critical. Further, the polymer should be thoroughly washed with water before treatment as all but very small amounts of residual acid can be removed in this way. Such preliminary washing is highly practical but not necessary.

The amount of propene oxide used in the treatment will depend upon the amount of residual acid in the polymer, the temperature of treatment, and, to some extent, the completeness of removal of residual acid required. As little as 0.2 part of propene oxide, per 100 parts of polymer, will give appreciable improvement in stability and in some cases complete removal of residual acid while the use of more than 5 parts of propene oxide is neither necessary nor practical. A crude chlorinated ethylene polymer which has been washed with water, generally will require up to 3.5 parts of propene oxide for assurance of complete removal of residual acid where the treatment is carried out at 50° C.–60° C. but at 90° C. less than 1.5 parts would be required. This illustrates the enhanced action of the propene oxide at the higher temperature and the fact that less propene oxide is required as the temperature is increased.

It is preferred to use 0.5-2 parts of propene oxide, per 100 parts of chlorinated ethylene polymer, at 70° C.–90° C. and this likewise represents the preferred conditions in treating chlorinated polymers generally although for complete removal of residual acid the amount of propene oxide required might run higher than two parts in some instances. However, washing with water and the introduction of an alkaline substance in the suspension of polymer remove all but traces of residual acid, so there is little probability of encountering a polymer in which unusually high proportions of propene oxide would be required.

The temperature at which the aqueous polymer suspension must be maintained during agitation is critical as already indicated. It must be at least 50° C. and, normally, would not exceed 110° C. Closed vessels under slight pressure may be used when the temperature is above 100° C. A temperature above 110° C. is not usually practical as some agglomeration of polymer particles may occur unless the concentration of polymer in the suspension is kept low such as below 10%. It is preferred, all factors considered, to operate at 70° C.–90° C.

The time of agitation is not critical as the residual acid is neutralized very quickly. Actually, one minute is sufficient to eliminate practically all of the residual acid but at least 10 or 15 minutes are ordinarily allowed as a safety factor. In commercial operations the period of agitation will hardly be less than 10 minutes as it takes substantially that time in the filling and emptying of the container.

For the purpose of removing the residual acid with the expenditure of a minimum of propene oxide, it is preferred to add to the polymer suspension an alkaline substance. This will neutralize some of the residual acid, thus saving on propene oxide, but it is not a susbtitute for propene oxide in removing the last traces of an acid. An advantage of using, specifically, the alkali metal hydroxides is that the propylene chlorohydrin formed by reaction of propene oxide with hydrogen chloride is completely destroyed by these hydroxides prior to drying the polymer. When a susbtance such as sodium bicarbonate is used the stability of the final product is essentially the same although part of the propylene chlorohydrin remains in the polymer and is released during the drying operation, this being a disadvantage in some cases because the chlorohydrin is toxic as well as corrosive to metals.

Any water-soluble organic or inorganic alkaline substance may be used and it is preferred to use it in quantity sufficient to neutralize all the residual acid it will attack although lesser amounts are beneficial to the extent they neutralize the acid. The use of a large excess of alkaline material is pointless as it produces no further stabilization of the dried polymer. Examples of suitable alkaline substances are sodium and potassium hydroxides, carbonates, and bicarbonates, sodium glycerate, sodium stearate, sodium acetate, calcium hydroxide, stearyl amine, monoethanolamine, urea and ammonium hydroxide.

Due to the presence of residual acid suspensions of these polymers are always acid at the start. To add an alkaline substance until any given pH is reached is not critical since the polymer can be freed of residual acid with propene oxide alone. Depending upon the alkaline substance used, the pH of the suspension may be above or below 7 even when the alkaline substance is added to excess. However, it is preferred to add strongly alkaline substances such as the alkali metal hydroxides and in an amount such that the pH of the suspension will be above 7 and may rise as high as 10 or 11.

Certain of these alkaline substances such as sodium hydroxide and sodium glycerate may be used to improve further the heat stability of the polymer by mixing such substances into the polymer, in the proportion of 0.1–0.25 part per 100 parts of dry polymer. This may be done by mixing the alkaline substance with the moist polymer after treatment with the propene oxide but before drying or by mixing with the dry polymer.

A chlorinated polymer even though it is completely freed of acid by the propene oxide treatment, may still discolor when heated to 150° C. in air or when rolled at 182° C., two conventionally used tests. It has been discovered that this tendency to discolor may be greatly minimized by adding to the aqueous medium in which the polymer is suspended for treatment, any solid water-soluble proteinaceous substance, gelatin being preferred in that discoloration is frequently completely eliminated when it is used. Other proteinaceous substances suitable include casein, glue, glycine, and alanine. 0.1–0.5 part of the proteinaceous substance per 100 parts of polymer may be used with a proportion of 0.1–0.2 part, per 100 parts, preferred, especially in the case of gelatin. These substances are to be added to the aqueous medium, not used in an after treatment; for example, gelatin, highly effective in the aqueous suspension, is completely ineffective when added to the dry polymer after removal from the suspension.

Another advantage in the use of these proteinaceous substances is that they have the effect of reducing the viscosity of the polymer suspension, making it feasible to increase the polymer concentration as much as 40% and more over the maximum concentration that can be handled conveniently in the absence of gelatin or the like. This is a quite important factor with respect to certain polymers which are normally in a form tending to give high viscosity suspensions as, for example, a chlorinated ethylene polymer which has been produced by chlorinating the ethylene polymer as it comes from the polymerizer in uncompacted state. In the case of such chlorinated ethylene polymer, a concentration of 15% by weight of the suspension is the maximum that can be readily handled but when gelatin is added to the suspension, the concentration of polymer can be increased to 22% with no appreciable increase in viscosity. Obviously, the use of gelatin in this case permits a substantial increase in the quantity of polymer which may be stabilized in a given unit in a given time.

Further noticeable improvement in the discoloration of polymers on heating to 160° C.–182° C. may be achieved by addition of 0.2–0.4 part of an anti-oxidant per 100 parts of dry polymer. That is, polymer which shows a tendency to discolor on heating even after the stabilization treatment in the presence of the poteinaceous substance, can be still further stabilized with respect to discoloration by the use of an anti-oxidant. A wide variety of anti-oxidants may be used but the most effective are the substituted phenols such as menthyl phenol, octyl phenol, ortho-hydroxy biphenyl, para-hydroxy biphenyl, 2,6-di(ter.-butyl) p-cresol, and glycerol salicylate. The anti-oxidant, in distinction from the proteinaceous substance, may be added to the aqueous polymer suspension or to the dried polymer with equally effective results. It has been found that the effect of the combination of the proteinaceous substance and the anti-oxidant results in much greater stability in the dried polymer than the use of either of these additives alone.

This invention provides a method for greatly improving the heat stability of and reducing the discoloration and odor evolved on heating chlorine-containing polymers over those methods heretofore known. The instant process, particularly when applied to chlorinated ethylene polymers, not only substantially reduces the amount of hydrogen chloride evolved upon heating the polymer at elevated temperatures but also realizes the production of polymers which are completely free of acid when heated to 160° C. in air. Furthermore, the process provides a method for producing chlorinated ethylene polymers which are not only free of acid but also free of any discoloration when heated at 160° C. in air or when rolled or otherwise processed at 182° C. and which possess good light stability. Neither of the latter results has heretofore been accomplished with chlorinated ethylene polymers. A further advantage of this invention lies in the fact that conventional metal driers may be used for drying wet chlorinated ethylene polymers without corrosion of the driers due to the elimination of hydrochloric acid, which causes darkening of the polymer product and metal contamination which, in turn, leads to further decomposition when the polymer is processed at elevated temperatures. The instant process employs a rapid, simple and economical procedure involving only very minor amounts of commercially available additives.

As a result of the advantages outlined above the chlorine-containing polymers so treated by this process may be extruded, injection and compression molded, coated, laminated, and otherwise processed at elevated temperatures into a variety of useful articles without the same amount of control of the fabrication temperatures as was necessary heretofore. This improvement is particularly noticeable in the case of chlorinated ethylene polymers which heretofore could not be extruded without some decomposition and evolution of hydrogen chloride. This was due to the fact that the high temperatures required for commercial rates of extrusion were only a few degrees below the temperature at which decomposition of the polymer began to take place with the evolution of hydrogen chloride. Now, however, with the advent of this invention the fabrication temperature range has been greatly widened, as much as 10° C. or more.

As many apparently widely different embodiments of this invention may be made without departing from the spirit and scope thereof, it is to be understood that the invention is not limited to the specific embodiments thereof except as defined in the appended claims.

I claim:

1. Process of treating a finely-divided, preformed solid chlorinated ethylene polymer which comprises agitating at a temperature of at least 50° C. said polymer suspended in an aqueous medium containing, per 100 parts of polymer by weight, 0.2–5 parts of propene oxide and 0.1–0.5 part of a proteinaceous substance.

2. Process of treating a finely-divided, preformed solid chlorinated ethylene polymer which comprises agitating at a temperature of 50° C.–110° C. said polymer suspended in an aqueous medium containing, per 100 parts of polymer by weight, 0.2–5 parts of propene oxide.

3. Process as set forth in claim 2 wherein said temperature is 50° C.–90° C.

4. Process of treating a finely-divided, preformed solid chlorinated ethylene polymer which comprises agitating at a temperature of 50° C.–110° C. said polymer suspended in an aqueous medium containing, per 100 parts of polymer by weight, 0.2–5 parts of propene oxide, 0.1–0.5 part of a proteinaceous substance, and a water-soluble alkaline substance.

5. Process as set forth in claim 4 wherein said alkaline substance is an alkali metal hydroxide present in an amount to raise the pH of said aqueous medium above 7.

6. Process of treating a finely-divided, preformed chlorinated solid ethylene polymer which comprises agitating at a temperature of 70° C.–90° C. said polymer suspended in an aqueous medium containing, per 100 parts of polymer by weight, 0.5–2 parts of propene oxide, 0.1–0.5 part of gelatin, and an alkali metal hydroxide present in an amount to raise the pH of said aqueous medium above 7.

7. Process of treating a finely-divided, preformed solid chlorinated ethylene polymer which comprises agitating at a temperature of 50° C.–90° C. said polymer suspended in an aqueous medium containing, per 100 parts of polymer by weight, 0.5–2 parts of propene oxide and 0.1–0.2 part of a proteinaceous substance.

8. Process as set forth in claim 7 wherein said proteinaceous substance is gelatin.

9. Process as set forth in claim 8 wherein said aqueous medium contains 0.2–0.4 part of a substituted phenol.

GELU STOEFF STAMATOFF.

REFERENCES CITED

The following references are of record in the file of this patent:

UNITED STATES PATENTS

| Number | Name | Date |
|---|---|---|
| 2,126,179 | Duggan | Aug. 9, 1938 |
| 2,316,481 | Whittaker | Apr. 13, 1943 |
| 2,462,422 | Plambeck | Feb. 22, 1949 |

FOREIGN PATENTS

| Number | Country | Date |
|---|---|---|
| 418,230 | Great Britain | Oct. 22, 1934 |
| 566,138 | Great Britain | Dec. 15, 1944 |